March 30, 1926.

M. C. BERSTED

GREASE GUN

Filed Nov. 27, 1920

1,578,951

Inventor:
Martin C. Bersted
By: Wm. F. Schutz

Patented Mar. 30, 1926.

1,578,951

UNITED STATES PATENT OFFICE.

MARTIN C. BERSTED, OF CHICAGO, ILLINOIS.

GREASE GUN.

Application filed November 27, 1920. Serial No. 426,722.

*To all whom it may concern:*

Be it known that I, MARTIN C. BERSTED, a citizen of the United States, residing at Chicago, in the county of Cook and State of Illinois, have invented certain new and useful Improvements in Grease Guns, of which the following is a specification.

This invention relates to novel improvements in grease guns for quickly and conveniently supplying grease for lubricating bearings or other parts, and while it is particularly useful in connection with motor vehicles it can be used for supplying grease wherever cups have been or may be employed.

Grease guns have been very extensively used in connection with automobiles and, so far as I am aware, a flexible metal hose has been provided by which the gun is detachably connected to each grease cup. The grease cups have been made in many shapes and sizes which greatly adds to the cost and in practice it has been found the hose and its connections very often and sometimes very quickly break because of the hard and often rough usage to which such devices are subjected.

One object of my invention is to provide a fitting of novel and improved construction which will permit the grease gun to be quickly and securely connected to the part to be greased and which will eliminate the troubles and the disadvantages inherent in prior devices.

Another object of the invention is to provide a novel fitting for use in connection with a grease gun and in place of the usual grease cup, this fitting being adjustable to various positions so that a single fitting may be used in many different positions to displace a variety of grease cups; further objects are to generally improve the various details so that the construction as a whole will be strong and substantial to withstand the usage to which it is and is liable to be subjected.

In the accompanying drawings illustrating a selected embodiment of the invention—

Figure 1:
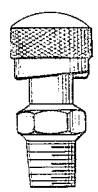
Fig. 1 is an elevation showing the fitting in its simplest form.
Figure 2:
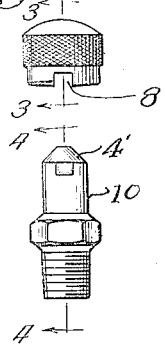
Fig. 2 shows the fitting with the cap removed.
Figure 3:
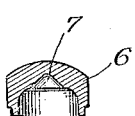
Figure 4:
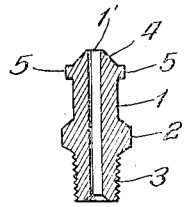

Figs. 3 and 4 are detail sectional views on the lines 3—3 and 4—4 respectively of Fig. 2.

Figure 5:
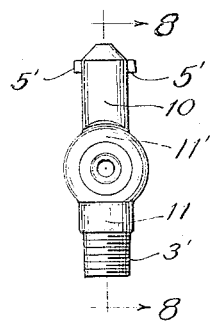
Figure 6:
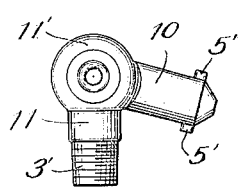
Figure 7:
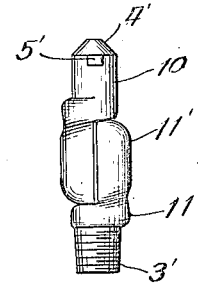

Figs. 5, 6 and 7 show the adjustable fitting in different positions.

Figure 8:
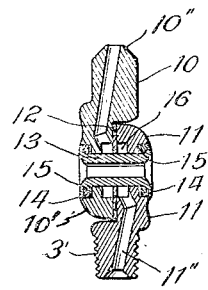

Fig. 8 is a sectional view on the line 8—8 of Fig. 5.

Figure 9:
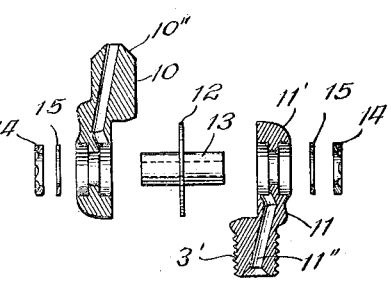

Fig. 9 is a sectional view corresponding to Fig. 8 with all of the parts separated.

Figure 10:
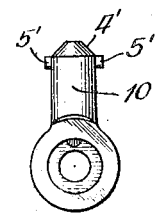

Fig. 10 is a detail elevation of one member of the adjustable fitting.

Figure 11:
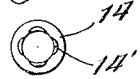

Fig. 11 is a detail view of a washer for the fitting.

The fitting shown in Figs. 1-4 comprises a stem 1 having a central bore 1', a hexagon portion 2 for a wrench, a threaded end 3 for securing the fitting in place, a conical outer end 4, and laterally projecting studs 5 beneath said end. This fitting is adapted to be substituted for the usual grease cups on automobiles, trucks and various mechanical parts and to be used wherever it may be found desirable. The cap 6 has a conical socket 7 to receive the conical end 4 of the stem, notches 8 to accommodate the studs 5, and inwardly directed peripheral cams 9 to engage the studs when the cap is turned on the stem to securely lock the cap to the stem.

The adjustable fitting of Figs. 5 to 11 comprises two members 10 and 11, which are pivotally connected for relative movement. The outer member 10 is provided with a conical end 4' and with laterally projecting studs 5' to receive a cap such as that shown in Figs. 1-3. The inner member 11 has a threaded end 3' whereby the fitting is secured in place. The two members 10 and 11 have circular end portions 10' and 11' which are adapted to fit snugly against each other upon an interposed washer 12 of leather, rubber or other suitable material and these members are pivotally secured together so that the outer member 10 can be readily adjusted relative to the inner member 11 by means of a hollow rivet 13 which passes entirely through the circular portions of the members and is spun or riveted down upon metal washers 14 interposed between the ends of the rivet and the circular portions of the members. I prefer to provide the washers 14 with notches or recesses 14' so that in the spinning or riveting operation the metal of the hollow rivet may be forced into the notches to make interlocking engagement between the washers and the rivet. I also provide leather washers 15 beneath the metal washers 14 and the construction is such that the members will be secured together adjustably but tightly so that grease will not escape through the joint. The members are provided with bores 10″ and 11″ which communicate with a centrally disposed chamber 16 of small size formed in the circular portions of the members about the rivet 13. The flexible washer 12 is held at its outer edge between the members and it engages the rivet upon which it is mounted within the chamber 16. In practice when pressure is put upon the grease gun to force grease through the bore 10″ to the bore 11″ and thence to a bearing the grease will be forced through the chamber 16 and the pressure will be sufficient to push the washer 12 to one side and permit the grease to pass through the chamber. This washer forms, under ordinary conditions, a closure for the grease passage in the fitting but, as before stated, it will yield to pressure sufficiently to permit the passage of grease under pressure from the gun. The outer member 10 of the fitting can be turned to any convenient position to receive the tube for connecting it with the gun; in fact it can be used in place of the straight fitting of Figs. 1–4 and of the usual angular grease cups which are provided to facilitate the use of a grease gun in places which are not otherwise readily accessible. The threaded end of the two fittings shown in Figs. 1–11 may be made male or female and of any size and thread; the rest of the fitting can be standard. The adjustable fitting can be used in any angular position and avoids the necessity of providing a stock of fittings of different angles.

With this fitting the gun can be so easily and quickly applied that it is not necessary to provide storage space for any considerable quantity of grease, as is customary in the usual grease cups. The fittings here shown and described will hold sufficient surplus grease to furnish lubrication for a reasonable period.

I am aware that changes in the form and proportion of parts, and in the details of construction of my invention may be made without departing from the spirit or sacrificing the advantages thereof, and I reserve the right to make all such changes as fairly fall within the scope of the following claims:

I claim:

1. A fitting for a grease gun comprising two pivotally connected members and having a passage extending therethrough, and means interposed between said members at their pivotal connection and projecting into said passage to normally close the passage but adapted to permit the flow of grease under pressure through the passage.

2. A fitting for a grease gun comprising two members having a passage extending therethrough, a pivot device extending through said passage and said members and pivotally connecting the members together, and a washer interposed between said members and projecting in said passage and arranged about the pivot device to normally close the passage but adapted to permit the flow of grease under pressure through the passage.

3. A fitting for a grease gun comprising two members, a rivet pivotally connecting said members, and washers interposed between the ends of the rivet and said members and interlockingly engaged with the rivet.

4. A fitting for a grease gun comprising two members, a rivet pivotally connecting said members, washers interposed between the ends of the rivet and the members and provided with notches and the ends of the rivet being pressed into interlocking engagement with said notches.

MARTIN C. BERSTED.